US008641868B2

(12) United States Patent
Mihara et al.

(10) Patent No.: US 8,641,868 B2
(45) Date of Patent: Feb. 4, 2014

(54) INORGANIC FIBER PAPER AND METHOD OF PRODUCING THE SAME

(75) Inventors: Tetsuya Mihara, Tokyo (JP); Ken Yonaiyama, Tokyo (JP); Tetsuya Ishihara, Tokyo (JP); Tomohiko Kishiki, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 13/064,639

(22) Filed: Apr. 5, 2011

(65) Prior Publication Data

US 2012/0247695 A1 Oct. 4, 2012

(30) Foreign Application Priority Data

Mar. 31, 2011 (JP) ................................. 2011-077939

(51) Int. Cl.
*D21H 13/36* (2006.01)
*D21H 13/40* (2006.01)
*D21H 27/00* (2006.01)

(52) U.S. Cl.
USPC ........... 162/145; 162/152; 162/156; 162/158; 162/9; 428/221; 428/364

(58) Field of Classification Search
USPC .............. 162/141, 145, 152, 156, 158, 164.1, 162/168.1, 9; 428/221, 292.1, 293.4, 296.7, 428/300.4, 359, 364
See application file for complete search history.

(56) References Cited

U.S. PATENT DOCUMENTS

| 4,487,657 | A | * | 12/1984 | Gomez | 162/158 |
| 4,612,251 | A | * | 9/1986 | Fredenucci et al. | 428/511 |
| 5,332,699 | A | * | 7/1994 | Olds et al. | 501/36 |
| 5,585,312 | A | * | 12/1996 | TenEyck et al. | 501/35 |
| 5,714,421 | A | * | 2/1998 | Olds et al. | 501/36 |
| 5,767,022 | A | * | 6/1998 | Clere et al. | 442/101 |
| 5,821,183 | A | * | 10/1998 | Jubb | 501/36 |
| 5,874,375 | A | * | 2/1999 | Zoitos et al. | 501/36 |
| 5,932,347 | A | * | 8/1999 | Rapp et al. | 428/392 |
| 5,955,389 | A | * | 9/1999 | Jubb | 501/36 |
| 6,025,288 | A | * | 2/2000 | Zoitos et al. | 501/36 |
| 6,030,910 | A | * | 2/2000 | Zoitos et al. | 501/36 |
| 6,294,491 | B1 | * | 9/2001 | Fay et al. | 501/35 |
| 6,627,568 | B2 | | 9/2003 | Kusuno et al. | 501/36 |
| 6,861,381 | B1 | * | 3/2005 | Jubb et al. | 501/35 |
| 6,953,757 | B2 | * | 10/2005 | Zoitos et al. | 501/35 |
| 7,153,796 | B2 | * | 12/2006 | Jubb et al. | 501/36 |
| 7,259,118 | B2 | * | 8/2007 | Jubb et al. | 501/36 |
| 7,749,923 | B2 | * | 7/2010 | Moore et al. | 442/23 |
| 7,767,597 | B2 | * | 8/2010 | Garvey | 442/2 |
| 8,110,512 | B2 | * | 2/2012 | Moore et al. | 442/23 |
| 2008/0166937 | A1 | * | 7/2008 | Garvey | 442/1 |
| 2010/0173552 | A1 | * | 7/2010 | Fernando et al. | 442/414 |
| 2011/0079746 | A1 | * | 4/2011 | Fernando et al. | 252/62 |
| 2011/0247839 | A1 | * | 10/2011 | Lalouch et al. | 169/45 |
| 2011/0248420 | A1 | * | 10/2011 | Cordts et al. | 264/115 |
| 2011/0250461 | A1 | * | 10/2011 | Frost et al. | 428/446 |
| 2011/0311404 | A1 | * | 12/2011 | Creedon et al. | 422/177 |
| 2012/0039756 | A1 | * | 2/2012 | Beauharnois | 422/168 |
| 2012/0247695 | A1 | * | 10/2012 | Mihara et al. | 162/3 |
| 2012/0255697 | A1 | * | 10/2012 | Ishihara et al. | 162/164.6 |

FOREIGN PATENT DOCUMENTS

| JP | 60-181400 | | 9/1985 |
| JP | 06-002298 | | 1/1994 |
| JP | 10-512232 | | 11/1998 |
| JP | 2000-199194 | | 7/2000 |
| JP | 2002-68777 | | 3/2002 |
| JP | 2002-069897 | | 3/2002 |
| JP | 2002-085918 | | 3/2002 |
| JP | 2004-143254 | | 5/2004 |
| JP | 2004-198981 | | 7/2004 |
| JP | 2006-009187 | | 1/2006 |
| JP | 2006-089881 | | 4/2006 |
| JP | 2006-152468 | | 6/2006 |
| JP | 2006-037269 | | 9/2006 |
| JP | 2006-336120 | | 12/2006 |
| JP | 2007-063078 | | 3/2007 |
| JP | 2010-013773 | | 1/2010 |
| JP | 2011042575 A | * | 3/2011 |
| JP | 2012207341 A | * | 10/2012 |
| JP | 2012211417 A | * | 11/2012 |
| WO | 97/16386 | | 5/1997 |
| WO | WO 2008136875 A1 | * | 11/2008 |
| WO | WO 2009018455 A1 | * | 2/2009 |
| WO | WO 2010077360 A2 | * | 7/2010 |
| WO | WO 2011083695 A1 | * | 7/2011 |

OTHER PUBLICATIONS

Machine Translation of Abstract of JP 2006-152468 A, published on Jun. 15, 2006.*
Partial Machine Translation of JP 2010-013773 A, published on Jan. 21, 2010.*

* cited by examiner

*Primary Examiner* — Jose Fortuna

(74) *Attorney, Agent, or Firm* — Steptoe & Johnson LLP

(57) ABSTRACT

Inorganic fiber paper includes first biosoluble inorganic fibers having an average fiber diameter of 3 to 7 μm, second biosoluble inorganic fibers having an average fiber diameter of 2 to 3 μm, and a binder, the average fiber diameter of the second biosoluble inorganic fibers being smaller than that of the first biosoluble inorganic fibers.

19 Claims, 2 Drawing Sheets

Fig.1

| Composition of inorganic fibers (parts by weight) | Fibers A (average diameter: 3.4 μm) | 0 | 20 | 40 | 60 | 80 | 100 |
|---|---|---|---|---|---|---|---|
| | Fibers C (average diameter: 2 to 3 μm) | 100 | 80 | 60 | 40 | 20 | 0 |
| Properties | Seal-tightness (l/min) | 7 | 8 | 10 | 12 | 13 | 15 |
| | Restoration rate (%) after compression and heating | 50 | 50 | 52 | 53 | 54 | 55 |

Fig.2

| Composition of inorganic fibers (parts by weight) | Fibers B (average diameter: 3.6 μm) | 0 | 20 | 40 | 60 | 80 | 100 |
|---|---|---|---|---|---|---|---|
| | Fibers C (average diameter: 2 to 3 μm) | 100 | 80 | 60 | 40 | 20 | 0 |
| Properties | Seal-tightness (l/min) | 8 | 9 | 10 | 13 | 14 | 16 |
| | Restoration rate (%) after compression and heating | 50 | 50 | 53 | 55 | 56 | 56 |

Fig. 3

| Composition of inorganic fibers (parts by weight) | Heat-treated fibers A (average diameter: 3.4 μm) | 0 | 20 | 40 | 60 | 80 | 100 |
|---|---|---|---|---|---|---|---|
| | Fibers C (average diameter: 2 to 3 μm) | 100 | 80 | 60 | 40 | 20 | 0 |
| Properties | Seal-tightness (l/min) | 7 | 9 | 10 | 12 | 14 | 16 |
| | Restoration rate (%) after compression and heating | 50 | 50 | 59 | 62 | 80 | 66 |

Fig. 4

| Composition of inorganic fibers (parts by weight) | Heat-treated fibers B (average diameter: 3.6 μm) | 0 | 20 | 40 | 60 | 80 | 100 |
|---|---|---|---|---|---|---|---|
| | Fibers C (average diameter: 2 to 3 μm) | 100 | 80 | 60 | 40 | 20 | 0 |
| Properties | Seal-tightness (l/min) | 8 | 9 | 11 | 13 | 15 | 16 |
| | Restoration rate (%) after compression and heating | 50 | 50 | 58 | 65 | 78 | 64 |

INORGANIC FIBER PAPER AND METHOD OF PRODUCING THE SAME

TECHNICAL FIELD

The invention relates to inorganic fiber paper and a method of producing the same. In particular, the invention relates to an improvement in the seal-tightness of inorganic fiber paper including biosoluble inorganic fibers.

BACKGROUND

Inorganic fiber paper is lightweight, has a good handling capability, and exhibits excellent heat resistance. Therefore, inorganic fiber paper is used as a heat-resistant seal material, for example. In recent years, it has been pointed out that health problems may occur due to inhalation of inorganic fibers into a lung of a living body. Therefore, biosoluble inorganic fibers that do not cause (or rarely cause) health problems upon inhalation have been developed (see JP-A-2002-068777, for example).

SUMMARY OF THE INVENTION

However, inorganic fiber paper produced using inorganic fibers that exhibit excellent heat resistance and excellent biosolubility may exhibit insufficient seal-tightness (e.g., may have high air-permeability).

The invention was conceived in view of the above problem. An object of the invention is to provide inorganic fiber paper that exhibits excellent seal-tightness, and a method for producing the same.

Inorganic fiber paper according to one embodiment of the invention that solves the above problem includes first biosoluble inorganic fibers having an average fiber diameter of 3 to 7 μm, second biosoluble inorganic fibers having an average fiber diameter of 2 to 3 μm, and a binder. The second biosoluble inorganic fibers have an average fiber diameter smaller than that of the first biosoluble inorganic fibers. The invention can provides inorganic fiber paper that exhibits excellent seal-tightness.

The inorganic fiber paper may include 30 to 90 mass % of the first biosoluble inorganic fibers, and 10 to 70 mass % of the second biosoluble inorganic fibers. The first biosoluble inorganic fibers may have an $SiO_2$ content of 50 to 82 mass %. The first biosoluble inorganic fibers may be biosoluble inorganic fibers that have been heated.

A method of producing inorganic fiber paper according to one embodiment of the invention that solves the above problem includes making paper using a raw material that includes first biosoluble inorganic fibers having an average fiber diameter of 3 to 7 μm, second biosoluble inorganic fibers having an average fiber diameter of 2 to 3 μm, and a binder, the average fiber diameter of the second biosoluble inorganic fibers being smaller than that of the first biosoluble inorganic fibers. The invention can provides a method of producing inorganic fiber paper that exhibits excellent seal-tightness.

The invention thus provides inorganic fiber paper that exhibits excellent seal-tightness.

BRIEF DESCRIPTION OF THE DRAWINGS

FIG. 1 is a view illustrating an example of evaluation results for the seal-tightness and the restoration rate after compression and heating of inorganic fiber paper obtained in an example according to one embodiment of the invention.

FIG. 2 is a view illustrating another example of evaluation results for the seal-tightness and the restoration rate after compression and heating of inorganic fiber paper obtained in an example according to one embodiment of the invention.

FIG. 3 is a view illustrating an example of evaluation results for the seal-tightness and the restoration rate after compression and heating of inorganic fiber paper including heat-treated biosoluble inorganic fibers obtained in an example according to one embodiment of the invention.

FIG. 4 is a view illustrating another example of evaluation results for the seal-tightness and the restoration rate after compression and heating of inorganic fiber paper including heat-treated biosoluble inorganic fibers obtained in an example according to one embodiment of the invention.

DETAILED DESCRIPTION OF THE PREFERRED EMBODIMENTS

Embodiments of the invention are described below. Note that the invention is not limited to the following exemplary embodiments.

Inorganic fiber paper according to one embodiment of the invention (hereinafter referred to as "the paper") includes first biosoluble inorganic fibers having an average diameter of 3 to 7 μm (hereinafter referred to as "first fibers"), second biosoluble inorganic fibers having an average diameter of 2 to 3 μm (hereinafter referred to as "second fibers"), and a binder. The second fibers have an average diameter smaller than that of the first fibers.

The paper that includes the first fibers having a relatively large average diameter and the second fibers having a relatively small average diameter exhibits characteristics derived from the first fibers, and excellent seal-tightness derived from the second fibers.

The first fibers may have an average diameter of 3.1 to 4.5 μm or 3.1 to 4.0 μm, for example. If the average diameter of the first fibers is larger than the above range, the density of the paper may decrease to a large extent, so that the strength of the paper may decrease. If the average diameter of the second fibers is smaller than the above range (e.g., 1 μm or less), the second fibers may break, so that the strength of the paper may decrease.

The paper may not include fibers having an average diameter of larger than 7 μm, for example. The paper may not include fibers having an average diameter of less than 2 μm, for example. Alternatively, the paper may not include fibers having an average diameter of less than 1 μm.

The average length of the first fibers is not particularly limited insofar as the paper can be properly produced, but is 1 to 200 mm, for example, and preferably 1 to 100 mm. The average length of the second fibers is not particularly limited insofar as the paper can be properly produced, but is 1 to 200 mm, for example, and preferably 1 to 100 mm. If the average length of the first fibers and the second fiber is within the above range, it is easy to produce the paper that has an appropriate density.

The terms "average diameter" and "average length" used herein respectively refer to the arithmetic mean fiber diameter and the arithmetic mean fiber length calculated from the fiber diameter and the fiber length of 300 to 500 fibers measured using an optical microscope, for example.

The first fibers and the second fibers are not particularly limited insofar as the first fibers and the second fibers are biosoluble inorganic fibers having an average diameter within the above range. The term "biosoluble inorganic fiber" refers to an inorganic fiber that exhibits biosolubility (e.g., the inorganic fiber is decomposed in a lung of a living body upon inhalation). For example, the first fibers and the second fibers are inorganic fibers having a dissolution rate in a physiological saline solution at 40° C. of 1% or more.

The dissolution rate of inorganic fibers in a physiological saline solution is measured as follows, for example. Specifically, 1 g of a specimen prepared by grinding inorganic fibers to a dimension of 200 mesh or less and 150 ml of a physiological saline solution are put in a conical flask (volume: 300 ml). The conical flask is then placed in an incubator (40° C.). Horizontal vibrations (120 rpm) are continuously applied to the conical flask for 50 hours. The concentrations (mg/l) of elements contained in a filtrate obtained by filtration are each measured using an ICP optical emission spectrometer. The dissolution rate (%) in a physiological saline solution is calculated based on the concentrations of the elements thus measured and the contents (mass %) of the elements in the inorganic fibers before being dissolved. For example, when the measured elements are silicon (Si), magnesium (Mg), calcium (Ca), and aluminum (Al), the dissolution rate C (%) in a physiological saline solution is calculated by the following expression "C (%)=[amount (L) of filtrate×(a1+a2+a3+a4)×100]/[mass (mg) of inorganic fibers before being dissolved×(b1+b2+b3+b4)/100]". In the above expression, a1, a2, a3, and a4 respectively indicate the measured concentrations (mg/l) of silicon, magnesium, calcium, and aluminum, and b1, b2, b3, and b4 respectively indicate the contents (mass %) of silicon, magnesium, calcium, and aluminum in the inorganic fibers before being dissolved.

The chemical composition of the first fibers and the second fibers is not particularly limited insofar as the first fibers and the second fibers have an average diameter within the above range and exhibit biosolubility. For example, either or both of the first fibers and the second fibers include silica ($SiO_2$) and an alkaline-earth metal oxide, and have an alkaline-earth metal oxide content of 10 to 80 mass %. The alkaline-earth metal oxide is one or two or more alkaline-earth metal oxides selected from the group consisting of calcia (CaO), magnesia (MgO), BeO, SrO, and BaO, for example. Among these, calcia (CaO) and/or magnesia (MgO) is preferable.

For example, either or both of the first fibers and the second fibers include silica ($SiO_2$), and at least one of calcia (CaO) and magnesia (MgO), and have an $SiO_2$ content of 35 to 82 mass, and a total content of CaO and MgO of 10 to 50 mass %. Either or both of the first fibers and the second fibers may be amorphous biosoluble inorganic fibers.

The first fibers and the second fibers may differ in chemical composition. For example, the first fibers may have an $SiO_2$ content of 50 to 82 mass % (preferably 70 to 80 mass %). In this case, the second fibers may have an $SiO_2$ content of 35 to 58 mass %.

For example, the first fibers have an $SiO_2$ content of 50 to 82 mass %, and preferably 58 to 82 mass, and a total content of CaO and MgO of 10 to 43 mass %, and preferably 18 to 34 mass % (more preferably 18 to 30 mass %).

If the $SiO_2$ content in the first fibers is within the above range, the first fibers exhibit excellent heat resistance in addition to biosolubility. The paper that includes the first fibers having a high $SiO_2$ content also exhibits excellent heat resistance.

When the first fibers have such a high $SiO_2$ content, it may be difficult to reduce the average diameter of the first fibers during production due to the properties of the melt having the above chemical composition. Therefore, it is difficult that the inorganic fiber paper exhibits sufficient seal-tightness using only the first fibers. The paper includes the second fibers having an average diameter smaller than that of the first fibers in addition to the first fibers having a high $SiO_2$ content. As a result, the paper exhibits excellent heat resistance derived from the first fibers, and excellent seal-tightness derived from the second fibers.

The first fibers may have a CaO content of 5 to 34 mass % (preferably 21 to 26 mass %), for example. Specifically, the first fibers may be biosoluble inorganic fibers having an $SiO_2$ content of 50 to 82 mass % and a CaO content of 5 to 34 mass % (hereinafter may be referred to as "$SiO_2$/CaO fibers"), for example.

The first fibers may have an MgO content of 1 mass % or less (i.e., 0 to 1 mass %), for example. Specifically, the first fibers may be $SiO_2$/CaO fibers having an $SiO_2$ content of 50 to 82 mass %, a CaO content of 5 to 34 mass %, and preferably 9 to 34 mass %, and an MgO content of 1 mass % or less, for example.

The MgO content in the first fibers may be 1 to 24 mass, preferably 10 to 24 mass %, and more preferably 10 to 20 mass % (more preferably 14 to 22 mass %). Specifically, the first fibers may be biosoluble inorganic fibers having an $SiO_2$ content of 50 to 82 mass %, an MgO content of 1 to 24 mass %, and preferably 10 to 24 mass, and a CaO content of 1 to 9 mass % (hereinafter may be referred to as "$SiO_2$/MgO fibers"), for example.

The first fibers may be biosoluble inorganic fibers that include $SiO_2$. MgO, and CaO as the main components. Specifically, the first fibers may have a total content of $SiO_2$, MgO, and CaO of 97 mass % or more (i.e., 97 to 100 mass %), for example.

Note that either or both of the first fibers and the second fibers may further include an additional component other than $SiO_2$ and the alkaline-earth metal oxide (e.g., at least one of MgO and CaO). For example, either or both of the first fibers and the second fibers may further include one or two or more components selected from the group consisting of alumina ($Al_2O_3$) titania ($TiO_2$), zirconia ($ZrO_2$), iron oxide ($Fe_2O_3$), manganese oxide (MnO), and potassium oxide ($K_2O$), for example.

The first fibers may have a total content of $SiO_2$, $Al_2O_3$, $ZrO_2$, and $TiO_2$ of 50 mass % to 82 mass, and a total content of CaO and MgO of 18 mass % to 50 mass.

When the first fibers include $Al_2O_3$, the first fibers have an $Al_2O$, content of 0 to 3 mass %, or 1 to 2 mass %, or 2 to 3 mass, for example. In this case, the first fibers may have a total content of $SiO_2$, MgO, CaO, and $Al_2O_3$ of 98 mass % or more (i.e., 98 to 100 mass %) or 99 mass % or more (i.e., 99 to 100 mass %), for example.

The first fibers may or may not include one or more additional Components selected from alkali metal oxides (e.g., $K_2O$ and $Na_2O$), $Fe_2O_3$, $ZrO_2$, $TiO_2$, $P_2O_4$, $B_2O_3$, $R_2O_3$ (wherein R is selected from Sc, La, Ce, Pr, Nd, Sm, Eu, Gd, Tb, Dy, Ho, Er, Tm, Yb, Lu, Y, and mixtures thereof), and the like. The content of each of these oxides may be 0.2 mass % or less or 0.1 mass % or less.

The second fibers may be rock wool, for example. Rock wool derived from a natural mineral or blast furnace slag may be used. Rock wool may be produced by blowing a melt obtained by melting a raw material (e.g., basalt or blast furnace slag) at 1500° C. to 1600° C. in a cupola or an electric furnace, or blowing high-temperature molten slag removed from a blast furnace to form fibers.

The chemical composition of rock wool may vary depending on the raw material. For example, rock wool may be biosoluble inorganic fiber having an $SiO_2$ content of 30 to 50 mass % (preferably 35 to 45 mass), an $Al_2O_3$ content of 10 to 20 mass %, an MgO content of 1 to 10 mass % (preferably 4 to 8 mass), a CaO content of 20 to 40 mass %, an $Fe_2O_3$ content of 0 to 3 mass %, and an MnO content of 0 to 1 mass %. For example, rock wool including 35 to 45 mass % of $SiO_2$, 1 to 10 mass % of MgO, 20 to 40 mass % of CaO, and 10 to 20 mass % of $Al_2O_3$, may be used.

For example, rock wool may have a longitudinal shrinkage rate ([(length before heating−length after heating)/length before heating)×100) when heated at 800° C. for 24 hours in air of 10% or more, or may have a longitudinal shrinkage rate when heated at 1100° C. for 24 hours in air of 12% or more.

The content of the first fibers and the content of the second fibers in the paper are not particularly limited insofar as the paper exhibits desired characteristics derived from the first fibers and desired seal-tightness derived from the second fibers.

Specifically, the paper may include 30 to 90 mass % of the first fibers and 10 to 70 mass % of the second fibers, or may include 40 to 80 mass % of the first fibers and 20 to 60 mass % of the second fibers, or may include 32 to 79.6 mass % of the first fibers and 16 to 59.7 mass % of the second fibers, or may include 36 to 78.4 mass % of the first fibers and 18 to 58.8 mass % of the second fibers, for example.

The total content of the first fibers and the second fibers in the paper may be 80 to 99.5 mass % or 90 to 98 mass %, for example.

If the content of the first fibers and the content of the second fibers are within the above range, excellent seal-tightness derived from the second fibers can be implemented without impairing characteristics derived from the first fibers.

Note that the paper may or may not include biosoluble inorganic fibers other than the first fibers and the second fibers. The paper may not include inorganic fibers other than the biosoluble inorganic fibers. The paper may not include organic fibers.

The first fibers may be biosoluble inorganic fibers that have been heated (hereinafter may be referred to as "heat-treated fibers"). In this case, the first fibers are biosoluble inorganic fibers that have the above chemical composition, and have been heated before making the paper, for example.

When the first fibers are heat-treated fibers, the paper exhibits excellent characteristics as compared with the case where the first fibers are biosoluble inorganic fibers that have not been heated (hereinafter may be referred to as "untreated fibers"). For example, the restoration rate after compression and heating of the paper that includes heat-treated fibers as the first fibers is higher than that of the paper that includes untreated fibers instead of the heat-treated fibers.

Note that the term "restoration rate after compression and heating of the paper" refers to the ratio by which the thickness of inorganic fiber paper is restored after the inorganic fiber paper has been compressed (i.e., reduced in thickness) and heated, i.e., the ratio of the thickness after compression and heating to the thickness before compression and heating.

The heating conditions (e.g., temperature and time) are not particularly limited insofar as the desired characteristics of the paper are improved. For example, the heating conditions are determined such that the restoration rate after compression and heating of the paper that includes heat-treated fibers is higher than that of the paper that includes untreated fibers.

The temperature at which the first fibers are heated in the heat treatment (hereinafter referred to as "heat treatment temperature") is 300 to 1300° C., for example, preferably 400 to 1300° C., and more preferably 700 to 1000° C. The heat treatment temperature may be less than the crystallization temperature of the first fibers, for example. Specifically, the heat treatment temperature may be 300° C. or more or 400° C. or more and less than the crystallization temperature, or may be 700° C. or more and less than the crystallization tempera-ture. The crystallization temperature is determined by thermogravimetry/differential thermal analysis (TG/DTA), for example.

If the heat treatment temperature is equal to or more than the crystallization temperature of the first fibers, the first fibers may become fragile after heating. Moreover, when partially crystallizing the first fibers at a temperature equal to or higher than the crystallization temperature of the first fibers, the biosolubility of the first fibers may deteriorate after heating. On the other hand, when heating the first fibers at a temperature less than the crystallization temperature of the first fibers, the first fibers neither become fragile nor exhibit reduced biosolubility.

The period of time for which the first fibers are held at the heat treatment temperature (hereinafter referred to as "heat treatment time") is not particularly limited, but is 1 minute to 48 hours, for example, and preferably 3 minutes to 24 hours.

The binder is not particularly limited insofar as the binder binds the first fibers and the second fibers. Either or both of an organic binder and an inorganic binder are used as the binder. Specifically, the paper includes either or both of an organic binder and an inorganic binder. For example, the paper may include only an organic binder, or may include an organic binder and an inorganic binder, or may include only an inorganic binder.

The organic binder may also be used as a forming assistant and a flocculant. For example, the organic binder is one or two or more organic binders selected from the group consisting of an acrylic resin such as an acrylate resin and a styrene-acrylic resin, an ethylene-vinyl acetate resin, a vinyl acetate resin, a styrene-butadiene resin, starch, and polyacrylamide. The inorganic binder is one or two or more inorganic binders selected from the group consisting of colloidal silica such as anionic colloidal silica and cationic colloidal silica, fumed silica, zirconia sol, titania sol, alumina sol, bentonite, and kaolin.

The paper may further include an additional component other than the first fibers, the second fibers, and the binder. For example, the paper may further include a fixing agent, a flocculant, or a forming assistant as the additional component. The total content of the fibers and the binder in the paper may be 96% or more.

The thickness of the paper is appropriately determined depending on the application and the desired characteristics. For example, the thickness of the paper is 0.1 to 8 mm, and preferably 0.5 to 6 mm.

The basis weight of the paper is appropriately determined depending on the application and the desired characteristics. For example, the basis weight of the paper is 10 to 2800 $g/m^2$, and preferably 75 to 1800 $g/m^2$.

The density of the paper is appropriately determined depending on the application and the desired characteristics. For example, the density of the paper is 0.1 to 0.35 $g/cm^3$, and preferably 0.15 to 0.3 $g/cm^3$.

The paper is used for various applications. For example, the paper is used for heating and/or heat-retention equipment. Specifically, the paper is used as a seal material (e.g., gasket) for a heat treatment apparatus, an industrial furnace, an incinerator, a burning appliance, an aluminum melting apparatus, a hot-water boiler, a hot water system, or a domestic gas stove, a denitrification catalyst buffer material, an oil heater wick, or the like.

A method of producing inorganic fiber paper according to one embodiment of the invention (hereinafter referred to as "the method") includes making paper using a raw material including the first fibers, the second fibers, and the binder (hereinafter referred to as "papermaking step"). The above paper is preferably is produced by the method.

In the papermaking step, the raw material including the first fibers, the second fibers, and the binder are prepared. The total of the content of the first fibers and the second fibers in the raw material (excluding a solvent) is 80 to 99.5 mass, and the content of the binder (either or both of an organic binder and an inorganic binder) in the raw material is 0.5 to 20 mass %, for example. The raw material may further include the above additional component. The content of the additional component is 5 mass % or less or 4 mass % or less, for example.

The raw material is prepared by mixing the first fiber, the second fiber, the binder, and the additional component (optional) with a solvent. The solvent is not particularly limited insofar as the first fibers, the second fibers, and the binder are mixed and dispersed in the solvent. For example, the solvent is water (e.g., distilled water, ion-exchanged water, tap water, ground water, or industrial water) and/or a polar organic solvent (e.g., monohydric alcohol such as ethanol or propanol, or dihydric alcohol such as ethylene glycol). The solvent is preferably water. The raw material thus prepared is a composition (e.g., slurry) that has fluidity and is suitable for papermaking.

In the papermaking step, the paper is produced using the raw material thus prepared. The paper may preferably be produced using a commercially available papermaking apparatus, for example.

When producing the paper including heat-treated fibers, heat-treated fibers are provided as the first fibers. In this case, the method includes making paper using a raw material including the first fibers that have been heated, the second fibers, and the binder to produce the paper.

The method may further include heating the first fibers (hereinafter referred to as "heat treatment step") before the papermaking step. In the heat treatment step, the first fibers (untreated fibers) are prepared, and heated to obtain heat-treated fibers.

The heat treatment conditions (e.g., heat treatment temperature and heat treatment time) may be appropriately determined as described above. For example, in the heat treatment step, the first fibers may be heated at a temperature less than the crystallization temperature of the first fibers. In the subsequent papermaking step, paper is made using the raw material including the heat-treated fibers obtained by the heat treatment step, the second fibers, and the binder.

EXAMPLES

Specific examples of the invention are described below.

Example 1

Production of Inorganic Fiber Paper

Amorphous $SiO_2$/CaO fibers having an $SiO_2$ content of 74 mass, a CaO content of 25 mass %, an MgO content of 0.3 mass %, and an $Al_2O_3$ content of 2 mass % (hereinafter referred to as "fibers A") were prepared as the first biosoluble inorganic fibers. The crystallization temperature of the fibers A was 895° C. The average diameter of the fibers A was 3.4 μm.

Rock wool having an $SiO_2$ content of 90 mass %, a CaO content of 35 mass, an MgO content of 5 mass %, and an $Al_2O_3$ content of 13 mass % (hereinafter referred to as "fibers C") was prepared as the second fibers. The average diameter of the fibers C was 2 to 3 μm.

Six types of inorganic fiber papers were produced which contain 100 parts by weight of the fibers A and 0 parts by weight of the fibers C, 20 parts by weight of the fibers A and 80 parts by weight of the fibers C, 40 parts by weight of the fibers A and 60 parts by weight of the fibers C, 60 parts by weight of the fibers A and 90 parts by weight of the fibers C, 80 parts by weight of the fibers A and 20 parts by weight of the fibers C, and 0 parts by weight of the fibers A and 100 parts by weight of the fibers C.

100 parts by weight of biosoluble inorganic fibers including the fibers A and C in the above ratio, 12 parts by weight of an acrylic resin ("AG-100" manufactured by Showa Denko K.K., solid content: 50%) (organic binder), 1.2 parts by weight of aluminum sulfate (0.2% solution, manufactured by Taimei Chemicals Co., Ltd.) (fixing agent), and 0.1 parts by weight of polyacrylamide ("DS414" manufactured by Seiko PMC Corporation, 0.5% solution) (flocculant) were mixed with 2000 parts by weight of water to prepare a raw material slurry. The raw material slurry was subjected to the papermaking step using a commercially available papermaking apparatus to obtain inorganic fiber paper. Each inorganic fiber paper had a thickness of 0.5 to 6 mm, a basis weight of 75 to 1800 g/m², and a density of 0.15 to 0.3 g/cm³.

Evaluation of Seal-Tightness

The seal-tightness of the inorganic fiber paper produced as described above was evaluated. Specifically, three specimens having an outer diameter of 30 mm and an inner diameter of 15 mm were obtained (punched) from arbitrary areas of each inorganic fiber paper.

The specimens were compressed using a flange such that the thickness was reduced by 50%. Air was supplied to the flange from a compressor, and the flow rate of air when the differential pressure became 30 KPa (1/min) was measured. The flow rate (permeability) thus measured was evaluated as the seal-tightness (1/min) of the inorganic fiber paper.

Evaluation of Restoration Rate

The restoration rate of the inorganic fiber paper after compression and heating was evaluated. Specifically, three specimens having a width of 25 mm and a length of 50 mm were cut from arbitrary areas of each inorganic fiber paper, and the thickness of each specimen (thickness before compression and heating) was measured using calipers.

The specimens were then compressed such that the thickness was reduced by 50%. The compressed specimen was placed in an electric furnace (500±15° C.), and held for 3 hours (compression and heating). The specimens were then released from the compression and heating.

The thickness (thickness after compression and heating) of the specimen was measured using calipers when 0.5 hours had elapsed after releasing the specimen from compression and heating. The ratio (%) of the thickness after compression and heating to the thickness before compression and heating was calculated as the restoration rate of the specimen.

Evaluation Results

FIG. 1 shows the evaluation results for the seal-tightness (1/min) and the restoration rate (%) after compression and heating of the six types of inorganic fiber papers that differed in the mixing ratio of the biosoluble inorganic fibers. Note that the seal-tightness and the restoration rate shown in FIG. 1 indicate the arithmetic mean values of the three specimens. A small value indicates high seal-tightness.

As shown in FIG. 1, the seal-tightness was improved with an increase in the mixing ratio of the fibers C in the inorganic fiber paper, although the restoration rate trended to decrease. In particular, when containing 40 to 80 parts by weight of the fibers A and 20 to 60 parts by weight of the fibers C, the inorganic fiber paper exhibited sufficient seal-tightness while maintaining the restoration rate.

Example 2

Production of Inorganic Fiber Paper

Amorphous $SiO_2$/MgO fibers having an $SiO_2$ content of 76 mass, a CaO content of 4 mass %, an MgO content of 18 mass, and an $Al_2O_3$ content of 2 mass % (hereinafter referred to as "fibers B") were prepared as the first fibers. The crystallization temperature of the fibers B was 857° C. The average diameter of the fibers B was 3.6 μm. The fibers C used in Example 1 were prepared as the second fibers.

Six types of inorganic fiber papers that differed in the mixing ratio of the fibers B and C (biosoluble inorganic fibers) were produced in the same manner as in Example 1. Each inorganic fiber paper had a thickness of 0.5 to 6 mm, a basis weight of 75 to 1800 $g/m^2$, and a density of 0.15 to 0.3 $g/cm^3$.

Evaluation of Seal-Tightness and Restoration Rate after Compression and Heating

The seal-tightness and the restoration rate after compression and heating of the inorganic fiber paper were evaluated in the same manner as in Example 1. FIG. 2 shows the evaluation results for the seal-tightness (1/min) and the restoration rate (%) of the six types of inorganic fiber papers that differed in the mixing ratio of the biosoluble inorganic fibers. Note that the seal-tightness and the restoration rate shown in FIG. 2 indicate the arithmetic mean values of the three specimens.

As shown in FIG. 2, the seal-tightness was improved with an increase in the mixing ratio of the fibers C in the inorganic fiber paper, although the restoration rate tended to decrease. In particular, when containing 40 to 80 parts by weight of the fibers B and 20 to 60 parts by weight of the fibers C, the inorganic fiber paper exhibited sufficient seal-tightness while maintaining the restoration rate.

Example 3

Production of Inorganic Fiber Paper

The fibers A that had been heated (hereinafter referred to as "heat-treated fibers A") were prepared as the first fibers. Specifically, the fibers A used in Example 1 were heated at 800° C., which was a temperature less than the crystallization temperature, for 20 minutes to obtain the heat-treated fibers A. The fibers C used in Example 1 were prepared as the second fibers.

Six types of inorganic fiber papers that differed in the mixing ratio of the heat-treated fibers A and the fibers C (biosoluble inorganic fibers) were produced in the same manner as in Example 1. Each inorganic fiber paper had a thickness of 0.5 to 6 mm, a basis weight of 75 to 1800 $g/m^2$, and a density of 0.15 to 0.3 $g/cm^3$.

Evaluation of Seal-Tightness and Restoration Rate after Compression and Heating

The seal-tightness and the restoration rate after compression and heating of the inorganic fiber paper were evaluated in the same manner as in Example 1. FIG. 3 shows the evaluation results for the seal-tightness (1/min) and the restoration rate (%) of the six types of inorganic fiber papers that differed in the mixing ratio of the biosoluble inorganic fibers. Note that the seal-tightness and the restoration rate shown in FIG. 3 indicate the arithmetic mean values of the three specimens.

As shown in FIG. 3, the seal-tightness was improved with an increase in the mixing ratio of the fibers C in the inorganic fiber paper. The restoration rate after compression and heating significantly increased as compared with the results (see FIG. 1) for Example 1 in which the untreated fibers A were used. Specifically, the restoration rate after compression and heating was significantly improved by using the heat-treated fibers A as the first fibers.

The restoration rate after compression and heating of the inorganic fiber paper including 80 parts by weight of the heat-treated fibers A and 20 parts by weight of the fibers C significantly increased as compared with the inorganic fiber paper including 100 parts by weight of the heat-treated fibers A and no the fibers C, differing from the results for Example 1 in which the untreated fibers A were used.

In particular, when containing 40 to 80 parts by weight of the heat-treated fibers A and 20 to 60 parts by weight of the fibers C, the inorganic fiber paper exhibited sufficient seal-tightness and a sufficient restoration rate.

Example 4

Production of Inorganic Fiber Paper

The fibers B that had been heated (hereinafter referred to as "heat-treated fibers B") were prepared as the first fibers. Specifically, the fibers B used in Example 2 were heated at 800° C., which was a temperature less than the crystallization temperature, for 20 minutes to obtain the heat-treated fibers B. The fibers C used in Example 1 were prepared as the second fibers.

Six types of inorganic fiber papers that differed in the mixing ratio of the heat-treated fibers B and the fibers C (biosoluble inorganic fibers) were produced in the same manner as in Example 1. Each inorganic fiber paper had a thickness of 0.5 to 6 mm, a basis weight of 75 to 1800 $g/m^2$, and a density of 0.15 to 0.3 $g/cm^2$.

Evaluation of Seal-Tightness and Restoration Rate after Compression and Heating

The seal-tightness and the restoration rate after compression and heating of the inorganic fiber paper were evaluated in the same manner as in Example 1. FIG. 4 shows the evaluation results for the seal-tightness (1/min) and the restoration rate (%) of the six types of inorganic fiber papers that differed in the mixing ratio of the biosoluble inorganic fibers. Note that the seal-tightness and the restoration rate shown in FIG. 4 indicate the arithmetic mean values of the three specimens.

As shown in FIG. 4, the seal-tightness was improved with an increase in the mixing ratio of the fibers C in the inorganic fiber paper. The restoration rate after compression and heating significantly increased as compared with the results (see FIG. 2) for Example 2 in which the untreated fibers B were used. Specifically, the restoration rate after compression and heating was significantly improved by using the heat-treated fibers B as the first fibers.

The restoration rate after compression and heating of the inorganic fiber paper including 80 parts by weight of the heat-treated fibers B and 20 parts by weight of the fibers C and the inorganic fiber paper including 60 parts by weight of the heat-treated fibers B and 40 parts by weight of the fibers C significantly increased as compared with the inorganic fiber paper including 100 parts by weight of the heat-treated fibers B and no the fibers C, differing from the results for Example 2 in which the untreated fibers B were used.

In particular, when containing 40 to 80 parts by weight of the heat-treated fibers B and 20 to 60 parts by weight of the fibers C, the inorganic fiber paper exhibited sufficient seal-tightness and a sufficient restoration rate.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in their entirety.

What is claimed is:

1. Gasket or sealing paper, consisting essentially of:
   first biosoluble inorganic fibers having an average fiber diameter of 3 μm to 7 μm,
   second biosoluble inorganic fibers having an average fiber diameter of 2 μm to 3 μm, the average fiber diameter of the second biosoluble inorganic fibers being smaller than that of the first biosoluble inorganic fibers, and
   a binder,
   wherein when compressed to 50% of its uncompressed thickness, and subjected to an air pressure differential of 30 KPa, the flow rate of air through the compressed gasket or sealing paper is less than 15 l/min.

2. The gasket or sealing paper according to claim 1, wherein the first biosoluble inorganic fibers have an average fiber diameter of 3.1 μm to 4.0 μm.

3. The gasket or sealing paper according to claim 1, comprising 30 mass % to 90 mass % of the first biosoluble inorganic fibers, and 10 mass % to 70 mass % of the second biosoluble inorganic fibers.

4. The gasket or sealing paper according to claim 3, comprising 40 mass % to 80 mass % of the first biosoluble inorganic fibers, and 20 mass % to 60 mass % of the second biosoluble inorganic fibers.

5. The gasket or sealing paper according to claim 1, wherein the biosoluble inorganic fibers comprise 50 mass % to 82 mass % of $SiO_2$, $Al_2O_3$, $ZrO_2$, and $TiO_2$ in total, and 18 mass % to 50 mass % of CaO and MgO in total.

6. The gasket or sealing paper according to claim 1, wherein the first biosoluble inorganic fibers comprise 50 mass % to 82 mass % of $SiO_2$, and 10 mass % to 43 mass % of CaO and MgO in total.

7. The gasket or sealing paper according to claim 1, wherein the second biosoluble inorganic fibers are rock wool.

8. The gasket or sealing paper according to claim 1, wherein the second biosoluble inorganic fibers comprise 35 mass % to 45 mass % of $SiO_2$, 1 mass % to 10 mass % of MgO, 20 mass % to 40 mass % of CaO, and 10 mass % to 20 mass % of $Al_2O_3$.

9. The gasket or sealing paper according to claim 1, wherein the first biosoluble inorganic fibers are biosoluble inorganic fibers that have been heated.

10. The gasket or sealing paper according to claim 9, wherein the first biosoluble inorganic fibers have been heated at 400° C. to 1300° C.

11. The gasket or sealing paper according to claim 1, wherein all fibers in the paper consist only of fibers which are either a first biosoluble inorganic fiber or a second biosoluble inorganic fiber.

12. The gasket or sealing paper according to claim 1, wherein the first biosoluble inorganic fibers have an $SiO_2$ content of 58 to 82 mass % and the second biosoluble inorganic fibers have an $SiO_2$ content of 30 to 50 mass %.

13. The gasket or sealing paper according to claim 1 which has a thickness of 0.1 to 8 mm.

14. The gasket or sealing paper according to claim 1, wherein the first biosoluble fibers are $SiO_2$/CaO fibers having an $SiO_2$ content of 50 to 82 mass %, a CaO content of 5 to 34 mass % and an MgO content of 1 mass % or less, or $SiO_2$/MgO fibers having an $SiO_2$ content of 50 to 82 mass %, and MgO content of 1 to 20 mass %, and a CaO content of 1 to 9 mass %.

15. The gasket or sealing paper according to claim 14, wherein the $SiO_2$/CaO fibers and $SiO_2$/MgO fibers have an $Al_2O_3$ content up to 3 mass %.

16. The inorganic fiber paper according to claim 1, wherein the first and second bio-soluble fibers are of different chemical compositions.

17. The gasket or sealing paper according to claim 1, wherein the flow rate is 14 l/min or less.

18. The gasket or sealing paper according to claim 1, wherein the flow rate is 14 l/min or less, and
   the gasket or sealing paper has a restoration ratio of 52% or more, as determined by a method comprising:
   measuring the thickness of a specimen of said gasket or sealing paper before compression and heating, then compressing the specimen until the thickness is reduced by 50% of the thickness before compression and heating, then holding the compressed specimen and heating it at a temperature of 500±15° C. for 3 hours, then removing the specimen from compression and heating, and measuring the thickness, 0.5 hours thereafter, and calculating the restoration ratio (%) of the thickness after compression and heating to the thickness before compression and heating.

19. A method of producing gasket or sealing paper according to claim 1,
   said method comprising;
   making a composition for paper making by:
     preparing first biosoluble inorganic fibers having an average fiber diameter of 3 μm to 7 μm,
     preparing second biosoluble inorganic fibers having an average fiber diameter of 2 μm to 3 μm, the average fiber diameter of the second biosoluble inorganic fibers being smaller than that of the first biosoluble inorganic fibers, and
     mixing said first and second biosoluble inorganic fibers with a binder;
   and producing a paper from said composition.

* * * * *